United States Patent
Nakagawa

[11] Patent Number: 5,265,568
[45] Date of Patent: Nov. 30, 1993

[54] INTAKE SYSTEM FOR INTERNAL COMBUSTION ENGINE

[75] Inventor: Tadashi Nakagawa, Higashihiroshima, Japan

[73] Assignee: Mazda Motor Corporation, Hiroshima, Japan

[21] Appl. No.: 951,190

[22] Filed: Sep. 28, 1992

[30] Foreign Application Priority Data

Sep. 27, 1991 [JP] Japan .................. 3-277038
Sep. 30, 1991 [JP] Japan .................. 3-280716

[51] Int. Cl.[5] ............ F02M 35/10; F02F 1/42
[52] U.S. Cl. ............... 123/306; 123/52 M; 123/188.14
[58] Field of Search ........ 123/52 M, 52 MC, 52 MV, 123/306, 308, 188.14

[56] References Cited

U.S. PATENT DOCUMENTS

| | | |
|---|---|---|
| 3,270,733 | 9/1966 | Steidler ............... 123/188.14 |
| 3,273,551 | 9/1966 | Julien et al. ........... 123/188.14 |
| 3,561,408 | 2/1971 | Weiand ................ 123/188.14 |
| 4,159,011 | 6/1979 | Sperry ................ 123/188.14 |
| 4,622,940 | 11/1986 | Yoshikawa ............ 123/188.14 |
| 5,050,566 | 9/1991 | Distelrath et al. ....... 123/188.14 |

FOREIGN PATENT DOCUMENTS 63-113748 7/1988 Japan .

Primary Examiner—Willis R. Wolfe
Attorney, Agent, or Firm—Keck, Mahin & Cate

[57] ABSTRACT

An intake system includes an intake port having a generally triangularly configured cross section so as to permit intake air to flow at a flow rate higher in an upper half section than in a lower half section, thereby producing vertical turbulence of intake air in a combustion chamber. The intake system further includes another intake port having a generally triangularly configured cross section so as to permit intake air to flow at a flow rate higher on a side of the periphery of the combustion chamber than on a side of the center of the combustion chamber and also at a flow rate higher on an upper side of the combustion chamber than on a lower side of the combustion chamber.

14 Claims, 16 Drawing Sheets

INTAKE SYSTEM FOR INTERNAL COMBUSTION ENGINE

BACKGROUND OF THE INVENTION

1. Field of the Invention

The present invention relates to an intake system for an internal combustion engine and, more particularly, to an intake system intake port structure for an internal combustion engine which produces vertical intake air turbulence in a combustion chamber.

2. Description of Related Art

Internal combustion engines have intake ports through which intake air is introduced into a combustion chamber. To obtain high combustion efficiency, it is necessary to produce strong "vertical turbulence" of intake air in a combustion chamber during an intake stroke, without using what is known as a "mask member," and/or to produce induction turbulence or swirling of intake air in a combustion chamber during an intake stroke, without using a mask member. Such vertical intake air turbulence and/or swirling of intake air is produced by providing an unbalanced distribution of intake air through an intake passage of an intake system including an intake port. In such an intake system, if an intake port has a circular cross section throughout its whole length and is curved or bent in a direction of intake air flow, a spiral motion of intake flow is undesirably generated by a secondary component of intake air flow at the curved or bent portion of the intake port. In particular, if the curved or bent portion of the intake port is large in length, because of the spiral motion of the intake air flow, it is difficult to provide an intended intake air distribution suitable for generating a desired vertical turbulence of intake air in the combustion chamber during an intake stroke.

To provide an unbalanced distribution of intake air, it has been proposed to form such a curved intake port which has a particular cross section uniformly configured along the whole length The cross section includes an upper or outer half section (which is a half section on an outer side of a center of the cross section as viewed from a center of curvature of the curved intake port) and a lower or inner half section (which is a half section on an inner side of a center of the cross section as viewed from a center of curvature of the curved intake port) smaller in width than the upper half section. The intake port, having a cross section thus configured, causes intake air to flow at a flow rate higher at the outer half section of the intake port than at the inner half section of the intake port. This produces intake air turbulence in the combustion chamber during an intake stroke. Such an intake port is known from, for instance, Japanese Unexamined Utility Model Publication No. 63-113,748.

The intake port described in this publication, however, causes a large loss in pressure of intake air at a transitional portion between the deformed cross section of the intake port and a round entrance to the combustion chamber. Such pressure loss leads to a drop in charging efficiency.

In an internal combustion engine having two intake ports per cylinder, intake air flows introduced through these two intake ports are directed in opposite circumferential directions in a combustion chamber. Such intake air flows interrupt the stable production of intake air swirling.

SUMMARY OF THE INVENTION

It is an object of the present invention to provide an intake system which produces strong vertical intake air turbulence in a combustion chamber during an intake stroke without a drop in charging efficiency.

It is another object of the present invention to provide an intake system which produces stable, strong swirling of intake air in a combustion chamber during an intake stroke.

The foregoing objects of the present invention are achieved by providing a particularly constructed intake system for an internal combustion engine having an intake port opening to a combustion chamber of the engine. The intake system is formed in the engine and couples an intake manifold with the combustion chamber so as to form a downstream part of the air passage. The intake port includes a downstream intake port portion, opening at a downstream end into the combustion chamber and opened and shut by an intake valve, for forming a downstream portion of the downstream part of the air passage. The intake port also includes an upstream intake port portion, continuously extending from the downstream intake port portion and opening at an upstream end to an outside of the engine, for forming an upstream portion of the downstream part of the air passage. The downstream intake port portion has an almost round cross section throughout its length which is configured so as to have a center line curving away from an axial direction, in which intake valve motion takes place, as it extends away from the downstream end. The upstream intake port portion has a cross section having a center line extending in a straight line and being configured symmetrically with a transverse center line drawn in a plane including the axis of the intake valve and the center line. The cross section consists of an inner half cross section on an inner side of the center line close to the axis line and an outer half cross section on an outer side of the upstream center line remote from the axis line. The outer half cross section is made smaller in area than the inner half cross section.

The intake system includes an intake pipe for forming an upstream part of the air passage coupling an intake manifold and the intake port. The intake pipe has a cross section having a cross section with a center line which curves oppositely to the downstream center line of the downstream intake port portion and which is a mirror image, in configuration, of the cross section of the upstream intake port portion of the intake port.

An intake system may further be provided with what is called a swirl intake port, formed in the engine, for coupling another intake pipe with the combustion chamber. The swirl intake port is directed toward a periphery of the combustion chamber rather than a center of the combustion chamber and has a cross section with its widest portion, in a direction of a transverse diametric center line of the cross section, passing a vertical center line of the combustion chamber, which is offset toward the periphery of the combustion chamber from the transverse diametric center line. The cross section further has the widest portion, in a direction of another transverse diametric center line, perpendicular to the transverse diametric center line, offset toward the vertical center line of the combustion chamber from the other transverse diametric center line.

Although the curved intake pipe produces spiral motion of intake air, since intake air flows at a flow rate which is higher in the outer half cross section than in the inner half cross section along the downstream portion of the intake pipe, which has a generally triangularly configured cross section, the spiral motion of intake air is substantially absorbed before the intake air enters into the intake port. Conversely, while the intake air flows in the intake port, it flows at a flow rate which is lower in the outer half cross section than in the inner half cross section along the upstream straight portion of the intake port, which has a generally triangularly configured cross section, and enters into the combustion chamber through the downstream bent portion, which has a round cross section. The intake port provides only a small change in configuration and area of a cross section at the transitional portion between the upstream straight portion and downstream bent portion, so as consequently to produce less resistance to the intake air flowing therethrough and to permit intake air to flow into the combustion chamber in a sufficient quantity to produce strong vertical turbulence or vertical spiral motion of the intake air in the combustion chamber.

The swirl intake port permits intake air to be distributed nonuniformly, in quantity, over the cross section of the combustion chamber. That is, intake air flows at a flow rate which is higher on the side of the periphery of the combustion chamber than on the side of the center of the combustion chamber and also at a flow rate which is higher on an upper side of the combustion chamber than on a lower side of the combustion chamber. As a result, strong swirling or induction turbulence of intake air along an inner circumference of a combustion chamber is produced.

BRIEF DESCRIPTION OF THE DRAWINGS

The above and other objects and features of the present invention will be clearly understood from the following description of a preferred embodiment thereof when considered in conjunction with the appended drawings, in which the same reference numerals have been used to designate the same or similar elements throughout the drawings, and in which.

DESCRIPTION OF THE PREFERRED EMBODIMENTS

Figure 1:
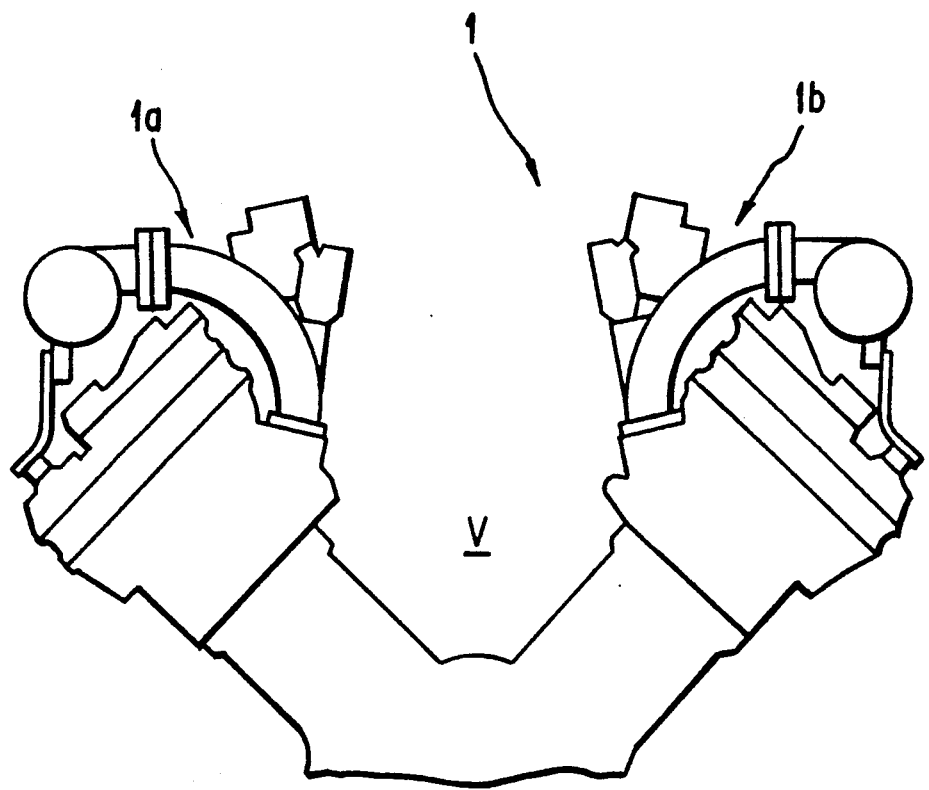
FIG. 1 is a schematic illustration showing a V-type internal combustion engine having an intake system in accordance with a preferred embodiment of the present invention.
Figure 2:
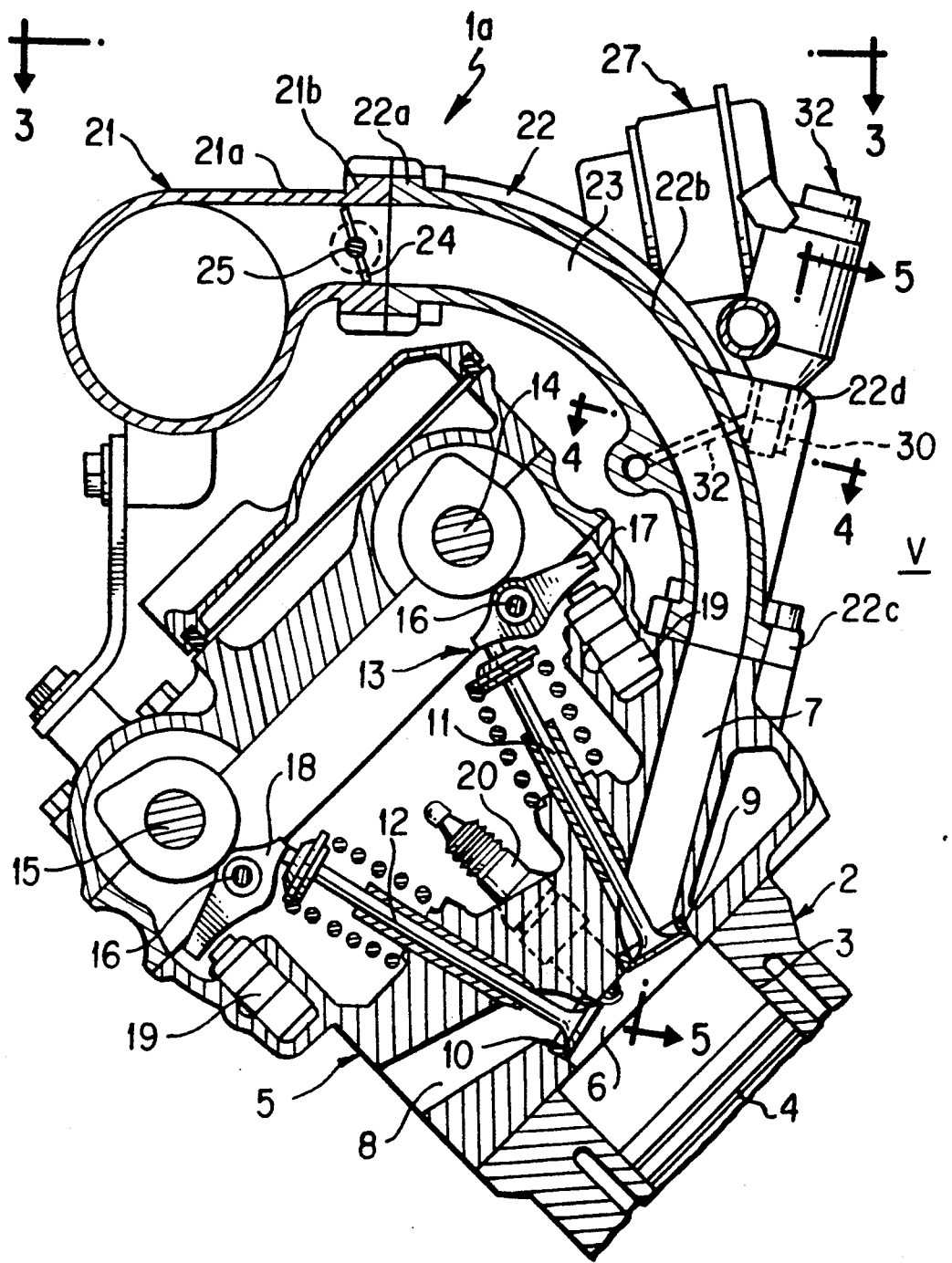
FIG. 2 is a vertical cross-sectional view of a first cylinder bank of the V-type internal combustion engine.
Figure 3:
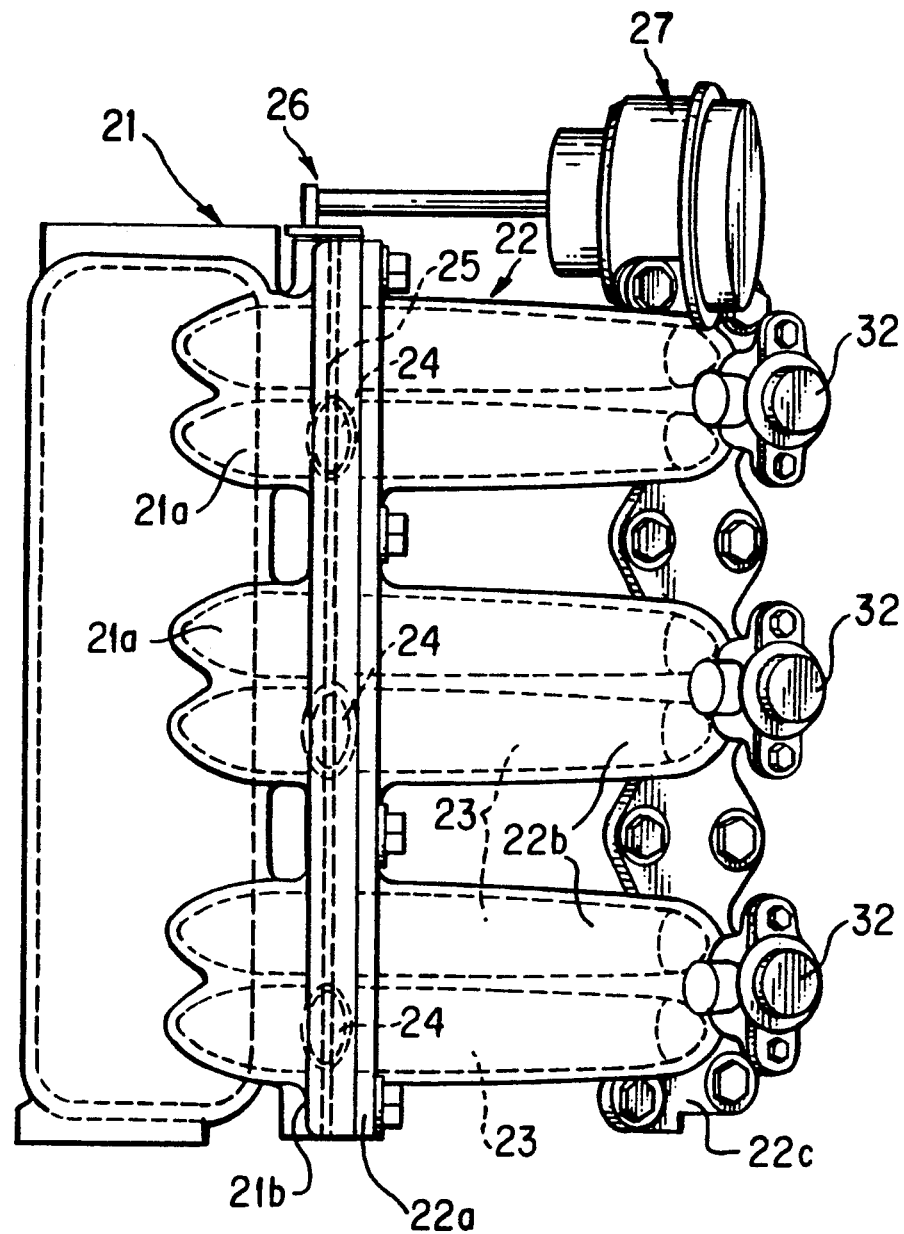
FIG. 3 is a cross-sectional view of FIG. 2 as seen along line 3—3.

Referring to the drawings in detail and, in particular to FIGS. 1 to 3, an engine body of an internal combustion engine, such as a V-type internal combustion engine, having an intake system in accordance with a preferred embodiment of the present invention, is shown. The engine body includes left or first and right or second cylinder banks 1a and 1b, arranged in a V-formation with a predetermined relative angle therebetween of, for instance, 60 degrees. Because the left and right cylinder banks 1a and 1b are the same in structure and operation as each other, the following description is of the left bank 1a (appearing on the left in FIG. 1) only.

The engine 1 has a cylinder block 2 provided with a plurality of cylinder bores 3 (only one of which appears in FIG. 2), in which pistons 4 can slide. A cylinder head 5 is mounted on the cylinder block 2 and provides for the left cylinder bank 1a. A bent-roof type of combustion chamber 6 is formed in the cylinder by the top of the piston 4, a lower wall of the cylinder head 5 and the cylinder bore 3. The cylinder head 5 is provided with a pair of intake ports 7 (only one of which is shown in FIG. 2) for each cylinder. Each intake port 7 extends to a V-shaped space V between the cylinder banks 1a and 1b. Further, the cylinder head 5 is provided with a pair of exhaust ports 8 (only one of which is shown in FIG. 2) for each cylinder. Each exhaust port 8 extends to the side of the corresponding cylinder bank 1a or 1b remote from the V-shaped space V. Each intake port 7 and each exhaust port 8 opens into the combustion chamber 6 at valve seat openings 9 and 10, respectively, and are opened and shut at a predetermined timing by an intake valve 11 and an exhaust valve 12, respectively. The intake valve 11 and the exhaust valve 12 are driven by a valve drive 13. The valve drive 13, which may be of any well known type, includes a pair of cam shafts 14 and 15, arranged on the top of the cylinder head 5 so as to extend parallel to an engine crankshaft (not shown) and separated on opposite sides of an axial center line of the crankshaft. The valve drive 13 also includes rocker arms 17 and 18 mounted for rotation on rocker arm shafts 16, respectively. Each rocker arm 17 or 18 has one end cooperating with a lash adjuster 19. Between the intake valve 11 and the exhaust valve 12, a spark plug 20 is disposed and fitted in the cylinder head 5.

Above the cylinder bank 1a, a surge tank 21 and an intake manifold 22, disposed between the cylinder head 5 and the surge tank 21, are provided. The surge tank 21 and the intake manifold 22 form part of the intake system. The intake manifold 22 includes a curved branch intake pipe 22b for each intake port. The branch intake pipe 22b is formed with flanges 22a and 22c at opposite ends. The intake manifold 22 is connected at the flange 22a with a flange 21b, which is formed at one end of a branch portion 21a extending from the surge tank 21. The intake manifold is further connected, at the flange 22c, with the cylinder head 5 so as to be in communication with the intake ports 7. The branch portion 21a of the surge tank 21 and the branch intake pipe 22b of the intake manifold 22 form an individual intake passage 23 leading to each intake port 7. In the individual intake passage 23, a valve 24 is provided within the branch portion 21 of the surge tank 21. The valves 24 are linked by a drive shaft 25 and are driven all together by means of an actuator 27 linked to the drive shaft 25 through a link 26.

Figure 4:
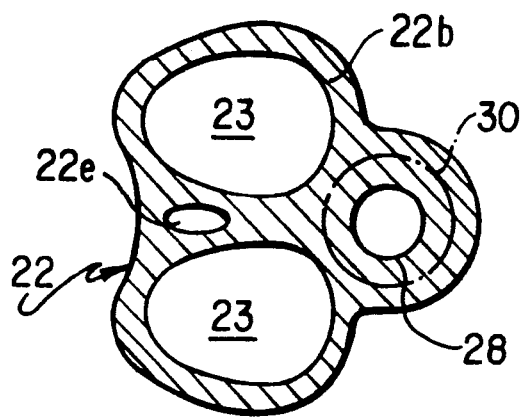
FIGS. 4 and 5 are cross-sectional views of FIG. 2 as seen along lines 4—4 and 5—5, respectively.
Figure 5:
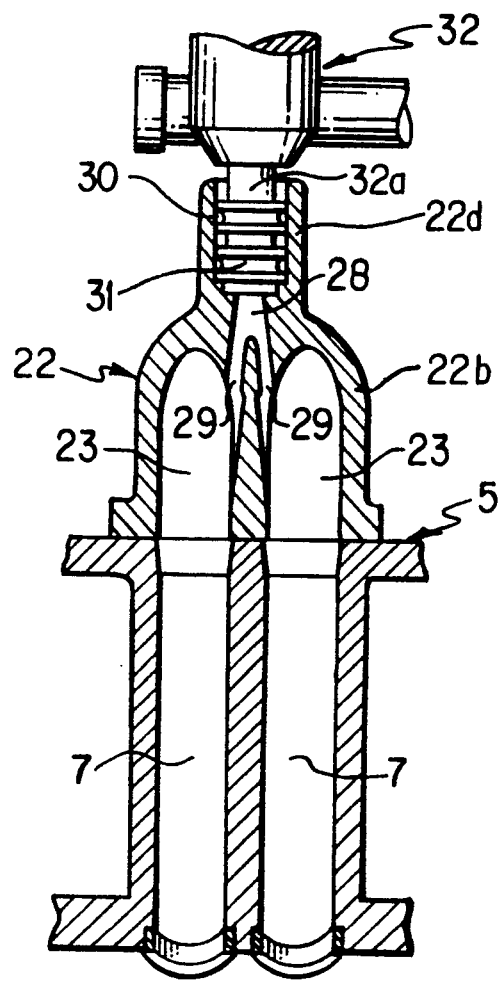

FIGS. 4 and 5 show the intake manifold 22 as being formed with a fuel injection chamber 28 between individual intake passages 23 for each cylinder in a downstream part of each branch intake pipe 22b. The fuel injection chamber 28 is in communication with the individual intake passages 23 through a pair of openings 29, respectively. The intake manifold 22 is provided with a mounting bed 22d extending upward therefrom. The mounting bed 22d is formed with a bore 30 so as to be in communication with the fuel injection chamber 28 and receive a sleeve 31 therein. The sleeve supports an injection nozzle 32a of a fuel injector 32. Fuel from the fuel injector 32 supplied through the injection nozzle 32a is directed into the fuel injection chamber 28, and then into the individual intake passages 23 through the openings 29. The sleeve 31 is formed with outer peripheral grooves 31 for introducing air through an assist air intake passage 22e.

Figure 6:
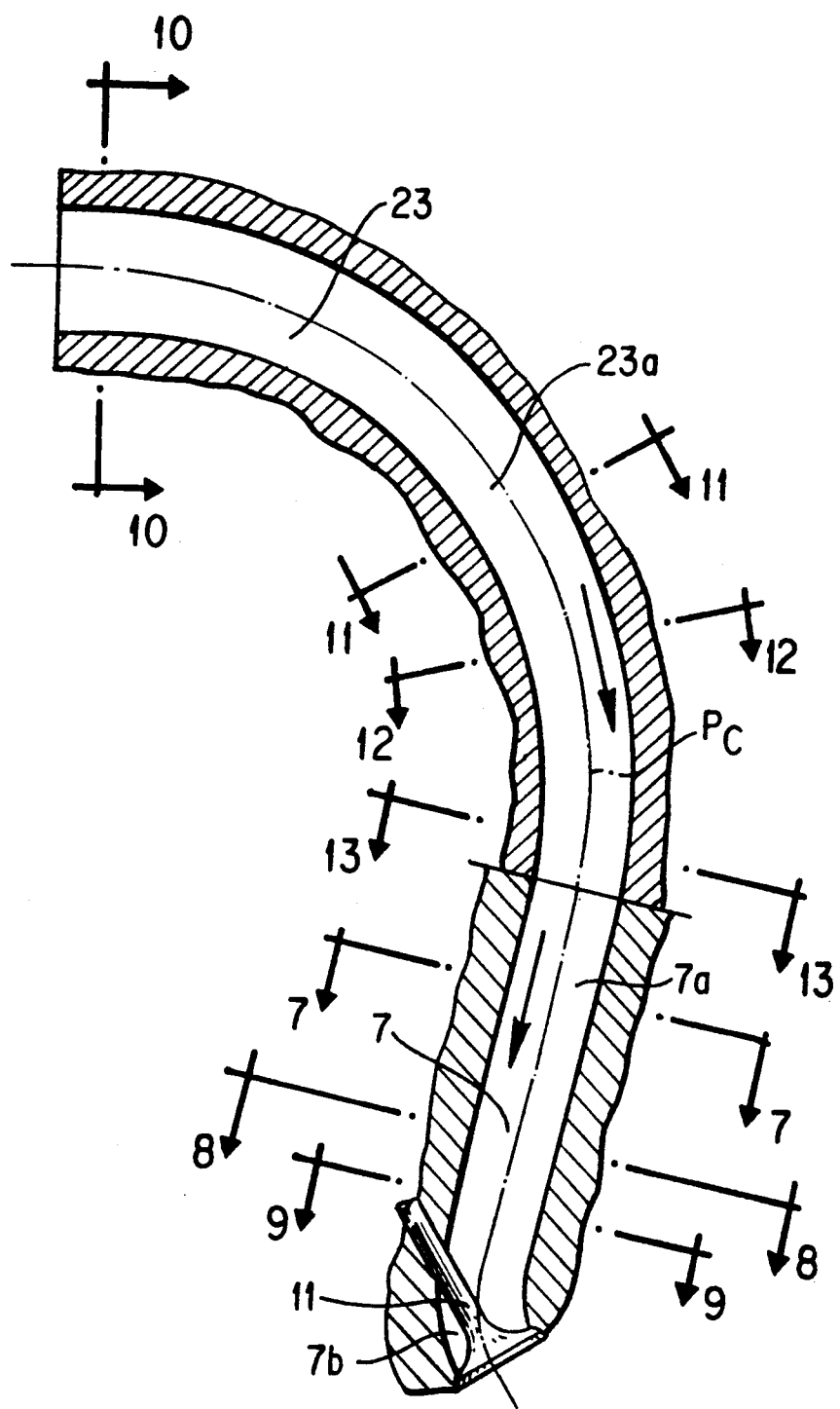
FIG. 6 is a schematic cross-sectional view of an intake air passage.

FIG. 6 shows geometrical details of a path of intake air formed by the individual intake passage 23 and the intake port 7. The intake air path is generally curved convexly relative to the V-shaped space V, as viewed in a vertical plane perpendicular to the camshafts 14 and 15, and is represented by a center line Pc having a center of curvature on an inner side of the cylinder head 5 remote from the V-shaped space V. Hereafter, a half section of a cross section of the intake passage 23, or the intake port on an outer side of the center line Pc of the intake air path as viewed from the center of curvature, is referred to as an upper or outer half section, and another half section of the cross section is referred to as a lower or inner half section.

Figure 7:
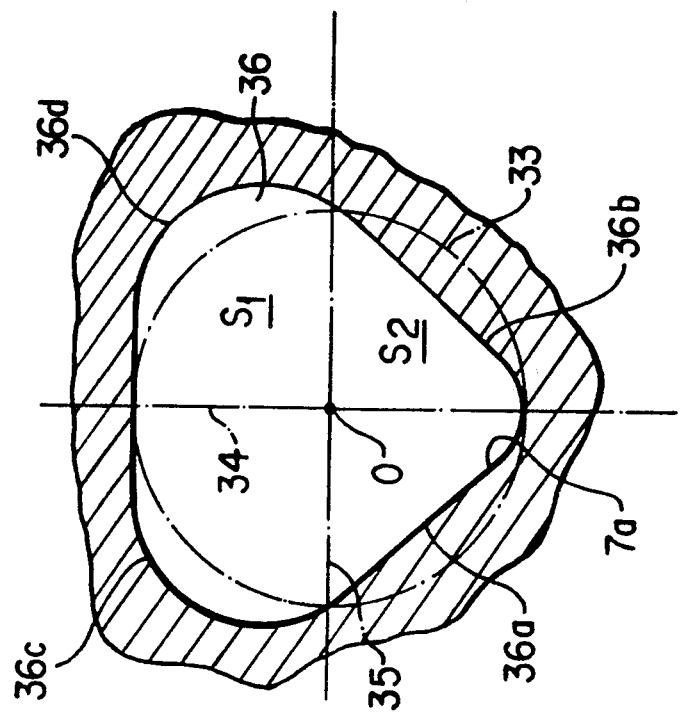
FIGS. 7 to 13 are cross-sectional views of FIG. 6 as seen along lines 7—7, 8—8, 9—9, 10—10, 11—11, 12—12 and 13—13, respectively.
Figure 8:
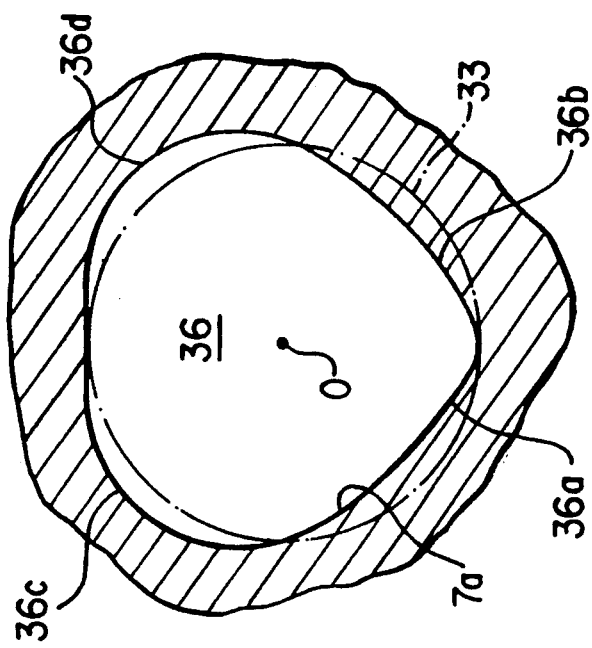
Figure 9:
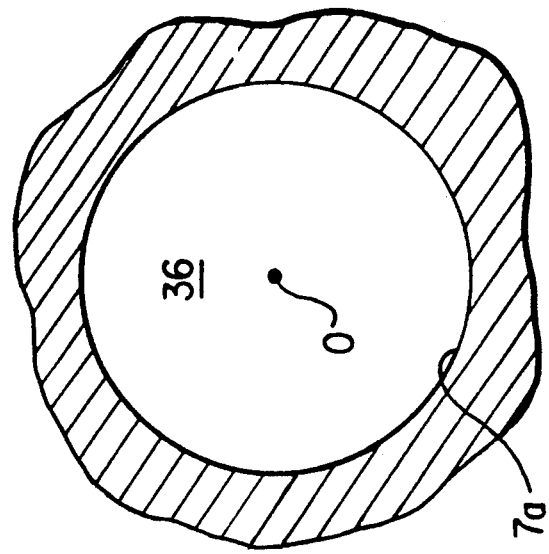

The intake port 7, forming a downstream part of the generally circular-arcuate intake air path, has an upstream straight portion 7a and a downstream bent portion 7b. The straight portion 7a is straight along almost its entire length. The downstream bent portion 7b, which is short in length, is curved or bent concavely to the V-shaped space V, as viewed in the vertical plane perpendicular to the camshafts 14 and 15, so as to be directed in substantially the same direction as a direction in which the intake valve 11 moves. The intake port has a cross section 36 which gradually changes in configuration from a round upstream end to a round downstream end. For an easy understanding of the configuration of the gradually changing cross section 36 of the intake port 7, a base circle 33, having a center o at the center line Pc of the intake air path, and diametrically intersecting center lines 34 and 3 of the basic circle 33, are shown. One of the center lines, namely, a lengthwise center line 35, is parallel to the cam shafts 14 and 15, and the other, namely, a transverse center line 34, intersects perpendicularly with the lengthwise center line 35. The base circle 33 is divided into four, i.e., first to fourth, quarter segments by the center lines 34 and 35. The upstream end of the straight portion 7a of the intake port 7 has a round cross section 36 identical to the base circle 33. The upstream portion of the straight portion 7a of the intake port 7 has a cross section 36 which gradually changes from a round configuration to a generally triangular configuration as shown in FIG. 7. The cross section 36 of the upstream portion of the straight portion 7a is formed by first and second quarter segments 36a and 36b, forming an outer half cross section $S_2$, and third and fourth quarter wall segments 36c and 36d, forming an inner half section $S_1$. The first and second quarter segments 36a and 36b are symmetrically deformed with respect to the transverse center line 34 so as to form the outer half cross section $S_2$ configured generally as an isosceles triangle with a rounded vertex on the base circle 33 of the intake port 7 on the side of the V-shaped space V. The outer half cross section $S_2$ is reduced so that it is smaller in area than a half of the basic circle 33. The third and fourth quarter segments 36c and 36e, by contrast, are symmetrically deformed or expanded with respect to the transverse center line 34 so as to form the inner half cross section $S_1$ so that it is configured generally as a rectangle which is larger in area than a half of the basic circle 33. The longitudinal side of the generally rectangular inner half cross section $S_1$ is tangential to the base circle 33. Accordingly, the cross section 36 of the upper portion has an inner half cross section $S_1$ larger in area than the outer half cross section $S_2$. The cross section 36 of the downstream portion of the straight portion 7a changes transitionally from the generally triangular configuration shown in FIG. 7 to a generally rounded triangular configuration as shown in FIG. 8, and finally to a circle which is identical to the basic circle 33 at the downstream end of the downstream bent portion 7b, as shown in FIG. 9.

Figure 10:
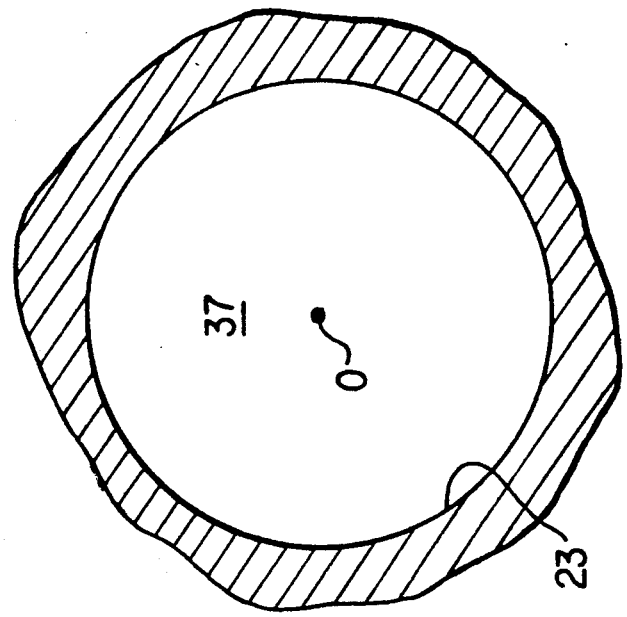
Figure 12:
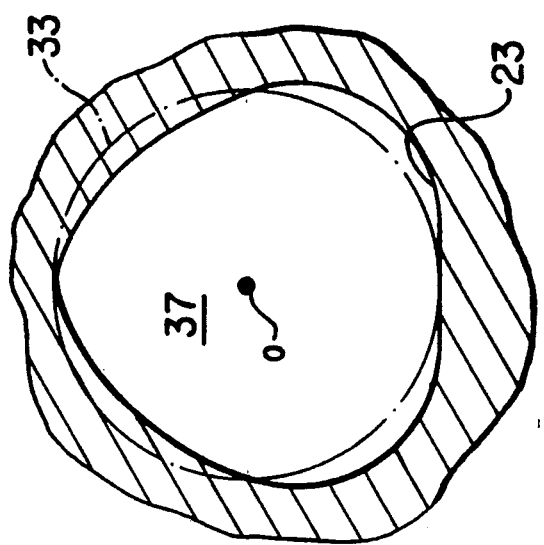
Figure 11:
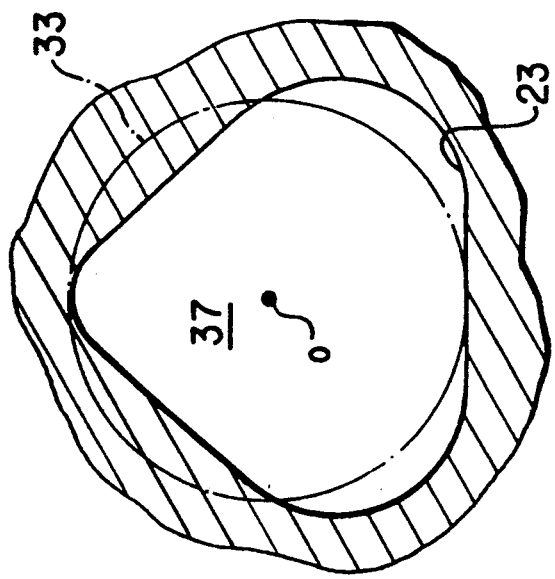
Figure 13:
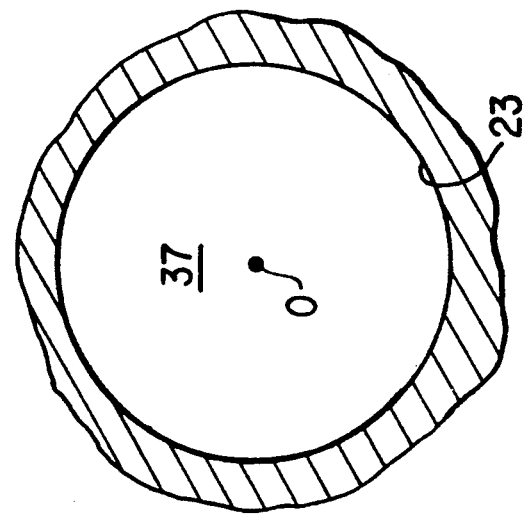

The individual intake passage 23, forming another part of the generally circular-arcuate intake air path, is curved convexly relative to the V-shaped space V along its whole length. The upstream end of the individual intake passage 23 has a circular cross section 37, which is larger in diameter than the base circle 33, as shown in FIG. 10. As shown in FIG. 11, the upstream portion of the individual intake passage 23 has a cross section 37, transitionally changing from a circular configuration to a generally triangular configuration, which is an mirror image configuration of the generally triangular configuration of the cross section 36 of the upstream portion of the straight portion 7a, shown in FIG. 7, with respect to the lengthwise center line 35. The cross section 36 of the downstream portion of the individual intake passage 23 is further deformed so as to gradually approach the basic circle 33 as shown in FIG. 12, and is finally identical with the basic circle 33 at the downstream end as shown in FIG. 13. The downstream end of the individual intake passage 23 and the upstream portion of the intake port 7 are identical in cross section with each other and, consequently, tightly connected.

Although the individual intake passage 23 of the intake manifold 22 produces spiral motion of intake air, since a main stream of the intake air flows at a flow rate which is higher in the outer half cross section $S_2$ than in the inner half cross section $S_1$ along the downstream portion 23a of the intake passage 23 having a generally triangularly configured cross section as shown in FIG. 11, the spiral motion of the intake air is absorbed before the intake air enters into the intake port 7. While the intake air flows in the intake port 7, the intake air also flows at a flow rate lower in the outer half cross section $S_2$ than in the inner half cross section $S_1$ along the upstream straight portion 7a of the intake port 7 having a generally triangularly configured cross section, as shown in FIG. 7. The intake air enters into the combustion chamber 6 through the downstream bent portion 7b having a round cross section. Because the upstream straight portion 7a has a cross section which is symmetrical with respect to the transverse center line 34, only a very small change in configuration and area of the cross section at the transitional portion between the upstream straight portion 7a and downstream bent portion 7b is provided. Consequently, the transitional portion of the intake port 7 provides less resistance to the intake air flowing therethrough. This permits intake air to flow into the combustion chamber 6 in sufficient quantity to produce strong vertical turbulence or vertical spiral motion of the intake air in a combustion chamber 6.

The intake port 7 and the individual intake passage 23 may have a modified cross sectional configuration.

Figure 14:
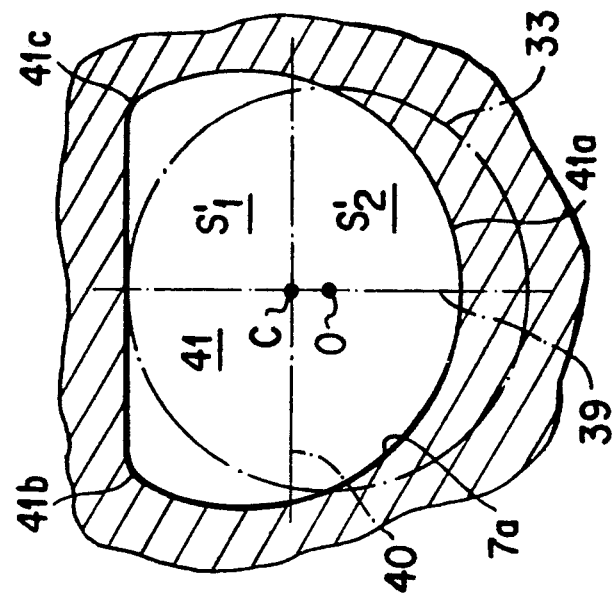
FIGS. 14 to 20 are cross-sectional views, similar to FIGS. 7 to 13, respectively, of a variation of the intake port.
Figure 16:
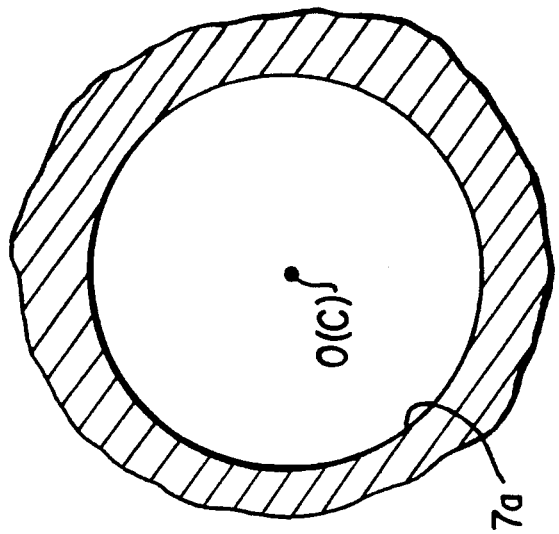
Figure 15:
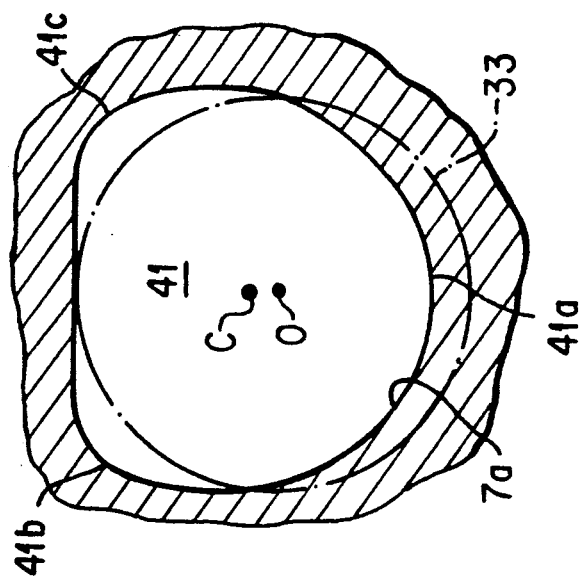

FIGS. 14 to 20, cross sections of the intake port 7 and the individual intake passage 23 according to another preferred embodiment of the present invention are shown. The cross sections respectively, correspond to those shown in FIGS. 7 to 13. A transverse center line 39 of a cross section 41, diametrically passing the center 0 of the basic circle 33, and a lengthwise center line 40, perpendicularly intersecting the center line 39 at a point c offset toward the inner side of the intake air path and parallel to the cam shafts 14 and 15, are shown. An upstream portion of the upstream straight portion 7a of the intake port 7 has a flat sided arcuate cross section 41 consisting of an outer half cross section $S'_2$, defined by a circular-arcuate segment 41a having a chord which is on the center line 40, and an inner half cross section $S'_1$, defined by second and third quarter segments 41b and 41c. The second and third quarter segments 41b and 41c are symmetrically deformed or expanded in area so as to form the inner half section $S'_1$ with a generally rectangular configuration and larger in area than a half of the basic circle 33. Accordingly, the cross section 41 of the upstream portion has an inner half cross section $S'_1$ which is larger in area than the outer half cross section $S'_2$. In other words, the widest portion of the cross section 41 is on the inner side of the intake port 7 remote from the V-shaped space V, as shown in FIG. 14. The intake port 7, having the cross section 41 larger in area on the inner half side than on the outer half side, causes a main stream of intake air to flow therein at a flow rate higher in the inner half cross section than in the outer half cross section through the upstream portion 7a. Since the cross section 41 at the upstream portion 7a has corners which are less sharply angled than generally triangularly configured cross section 36 shown in FIG. 7, the intake port 7 generates less turbulence due to separation of the intake air from wall of the intake port 7 so as to provide a decrease in resistance to intake air. The cross section 41 of the downstream portion of the straight portion 7a is further deformed so as to gradually approach the basic circle 33 as shown in FIG. 15, and finally becomes identical with the basic circle 33 at the downstream end of the downstream bent portion 7b as shown in FIG. 16.

Because the flat sided arcuate cross section 41 is more similar to the base circle 33 than to the generally triangularly configured cross section 36 shown in FIG. 7, it is easy to smoothly deform the cross section of the intake port 7 so that it becomes round at the downstream end.

Figure 18:
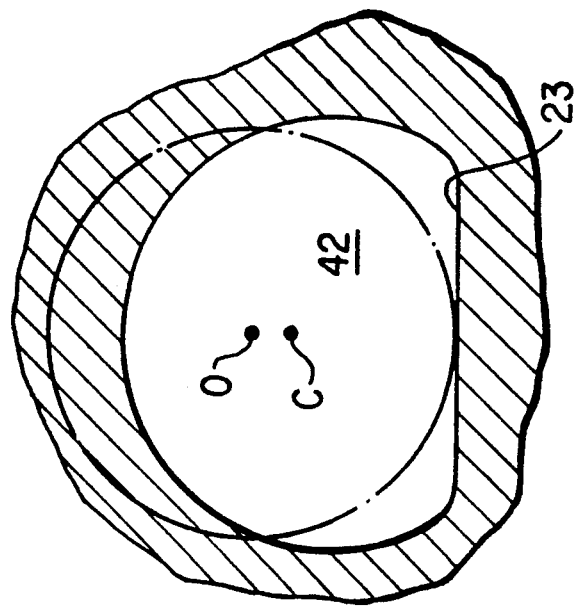
Figure 17:
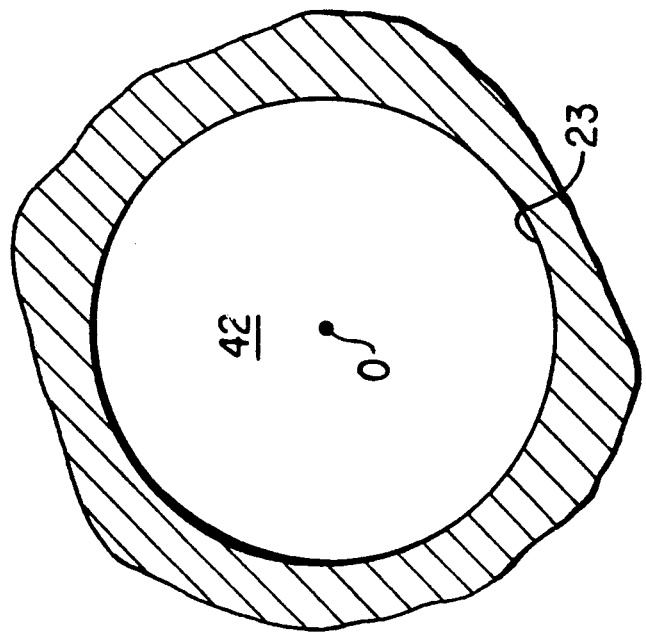
Figure 20:
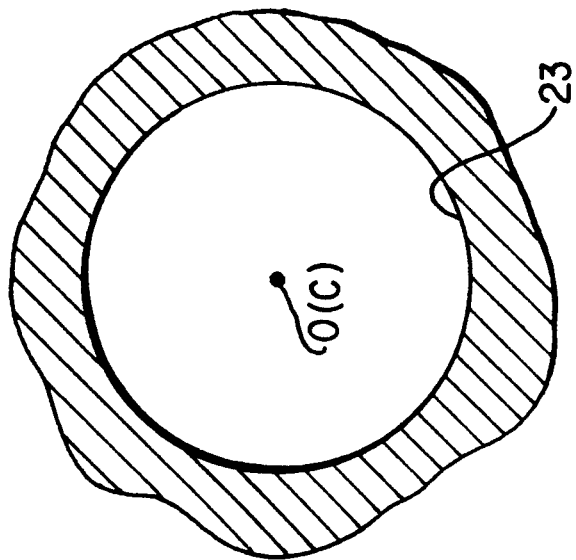
Figure 19:
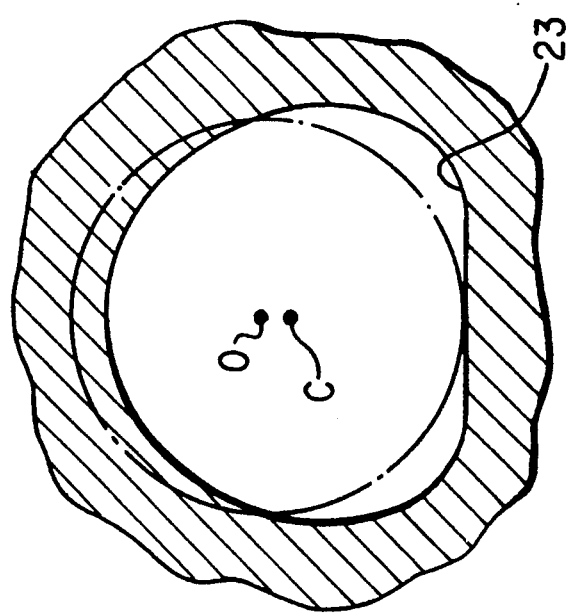

As shown in FIG. 17, the upstream end of the individual intake passage 23 has a round cross section 42 which is larger in diameter than the base circle 33. Further, as shown in FIG. 18, the cross section 42 of the upstream portion of the individual intake passage 23 gradually changes to a flat sided arcuate configuration which is a mirror image of the flat sided arcuate configuration of the cross section 41 of the upstream portion of the intake port 7 shown in FIG. 15. The cross section 42 of the downstream portion of the individual intake passage 23 is further deformed so as to gradually approach the basic circle 33, as shown in FIG. 19 and, finally, be identical with the basic circle 33 at the downstream end of the individual intake passage 23, as shown in FIG. 20.

The effect of a cross sectional configuration of an intake port o intake air flow between the preferred embodiments described above and the prior art has been verified experimentally.

Figure 21:
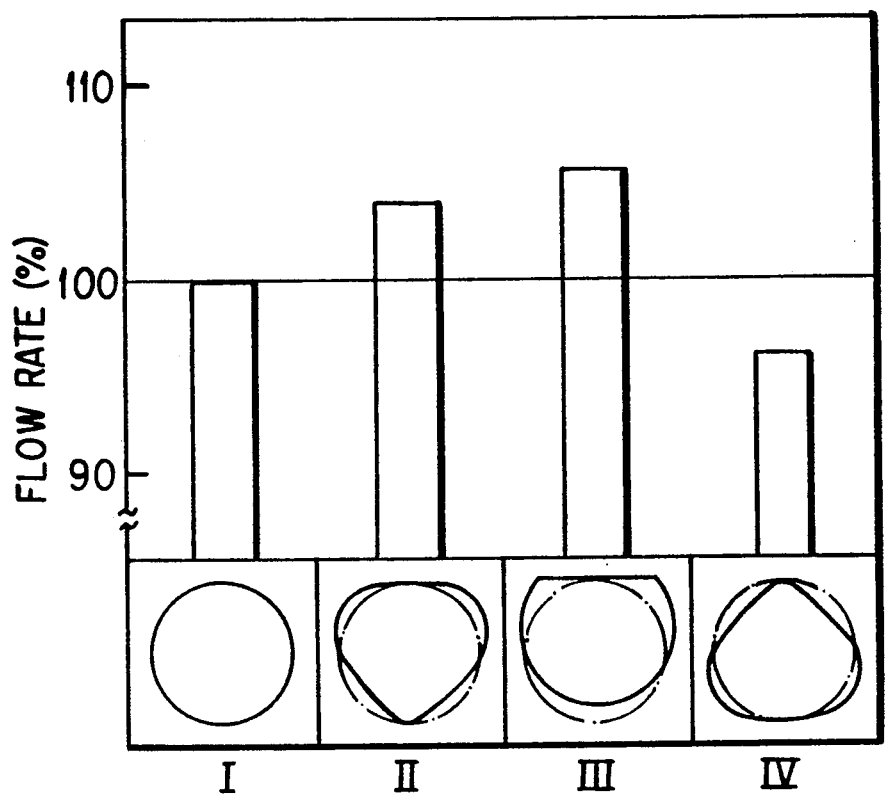
FIG. 21 is a graph illustrating the effect of the intake port of the present invention on intake air flow rate.

Referring to FIG. 21, taking the flowing rate of a conventional round type of an intake port (I) as 100%, the intake port 7 of the present invention, having a generally triangularly configured cross section 36 or a generally arcuately configured cross section 42, has a flow rate higher than 100%. However, it has also been verified that if an intake port has a cross section which gradually changes so as to form a generally triangular configuration, having a vertex on a concave side of the path of intake air remote from the V-shaped space V, between rounded upstream and downstream ends, a flow rate of less than 100% will be provided.

Figure 22:
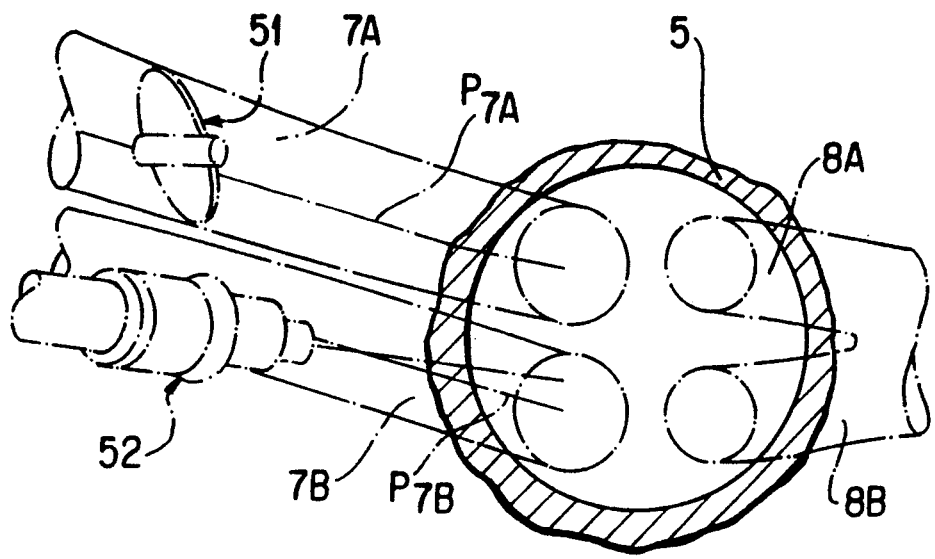
FIG. 22 is a schematic illustration of a combustion chamber cooperating with an intake system in accordance with another preferred embodiment of the present invention.
Figure 23:
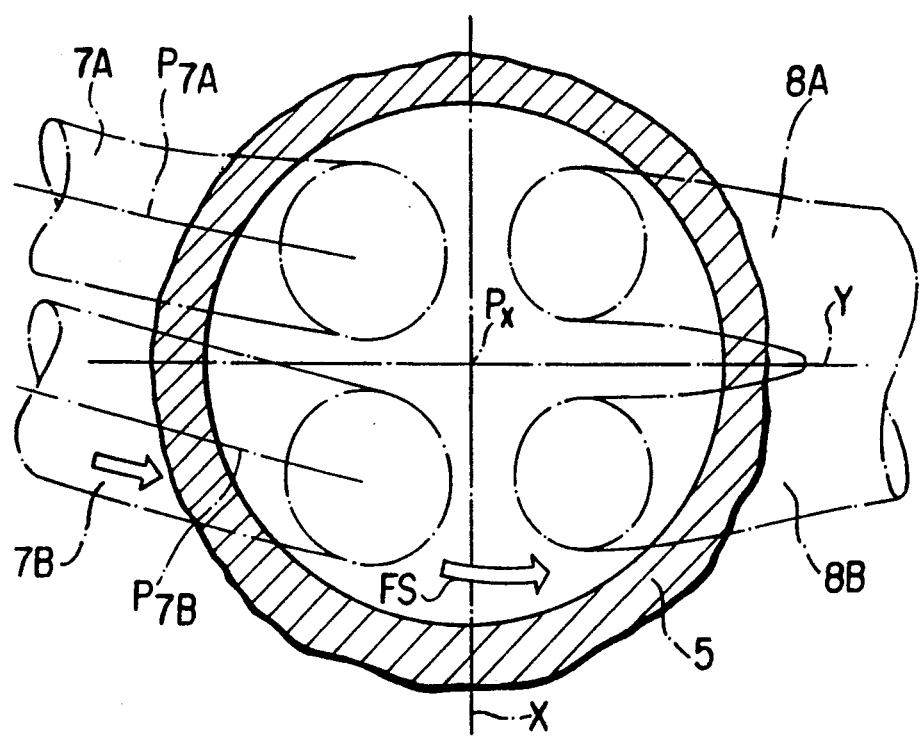
FIG. 23 is an enlarged plan view of the combustion chamber.
Figure 24:
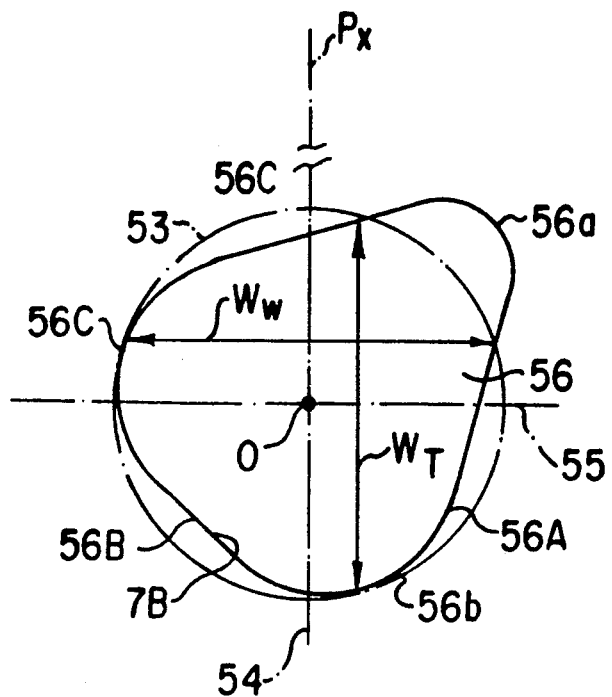
FIG. 24 is a cross-sectional view showing a swirl intake port of the intake system of FIG. 22.

FIGS. 22 to 24 show an intake system in accordance with another preferred embodiment of the present invention. In this embodiment, intake ports are configured so as to produce swirling or induction turbulence of intake air, in addition to vertical turbulence, in a combustion chamber of an engine. A cylinder head 5 is formed with a pair of intake ports 7A and 7B for each cylinder and a pair of exhaust ports 8A and 8B for each cylinder. The intake ports 7A and 7B and the exhaust ports 8A and 8B open into the combustion chamber 6 at valve seat openings 9 and 10, respectively, and are opened and shut at a predetermined timing by intake valves and exhaust valves (not shown), respectively. One of the intake ports, for example, the intake port 7A, which is hereinafter referred to as a primary intake port, has a straight upstream portion 7a and a bent downstream portion 7b. The upstream and downstream portions are the same in cross sectional configuration as those of the intake port 7 of the previous embodiment, so as to produce vertical turbulence of intake air in the combustion chamber 6 in an intake stroke. A center line $P_{7A}$ of the primary intake port 7A extends and is directed closer to a center Px of the combustion chamber 6 rather than the periphery of the combustion chamber 6. Another intake port, namely, the intake port 7B, which is hereinafter referred to as a swirl intake port, has a center line $P_{7B}$, extending and directed closer to the periphery of the combustion chamber 6 than the center Px of the combustion chamber 6. The primary intake port 7A is provided with a throttle valve 51 therein. Further, the swirl intake port 7B is provided with a fuel injector 52 therein so as to inject fuel toward the center Px of the combustion chamber 6.

As shown in FIG. 24, the swirl intake port 7B has a generally isosceles triangular cross section 56. For easy understanding of the configuration of the isosceles triangular cross section 56 of the swirl intake port 7B, a base circle 53 of the isosceles triangular cross section 56, identical to the intake valve seat 9 and having its center O at the center line $P_{7B}$ of the intake air path, a diametric center line 54 in a line passing through the vertical center line Px of the combustion chamber 6, and a diametric center line 55 perpendicularly intersecting the diametric center line 54, are shown.

The isosceles triangular cross section 56 is defined by the base 56B and the oblique sides 56A and 56C. The base 56B extends almost, but not exactly, parallel to the center line X of the combustion chamber 6. Both of the base corners 56b and 56c are located on the base circle 53. The top rounded corner or vertex 56a is located out of the base circle 5 and closer to the periphery of the combustion chamber 6 than to the vertical center line Px of the combustion chamber 6 with respect to the center line $P_{7B}$ of the intake air path. That is, one of the widest portions of the cross section 56, indicated by a reference $W_T$, is on the forward side of flowing of intake air with respect to the center line 54, and the other of the widest portions of the cross section 56, indicated by a reference $W_W$ perpendicular to the widest portions $W_T$, is on a side of the vertical center line Px of the combustion chamber 6 with respect to the center line 55. Accordingly, the swirl intake port 7B provides a column of intake air having an air quantity which is distributed nonuniformly over the cross section. That is, the intake air column has a flow rate higher on the side of the periphery of the combustion chamber 6 than on the side of the center Px of the combustion chamber 6 and also has a flow rate higher on an upper side of the combustion chamber 6 than on a lower side of the combustion chamber 6. Such an intake air column generates strong swirl of intake air along an inner circumference of the combustion chamber 6, as shown by an arrow SF in FIG. 24.

Figure 25:
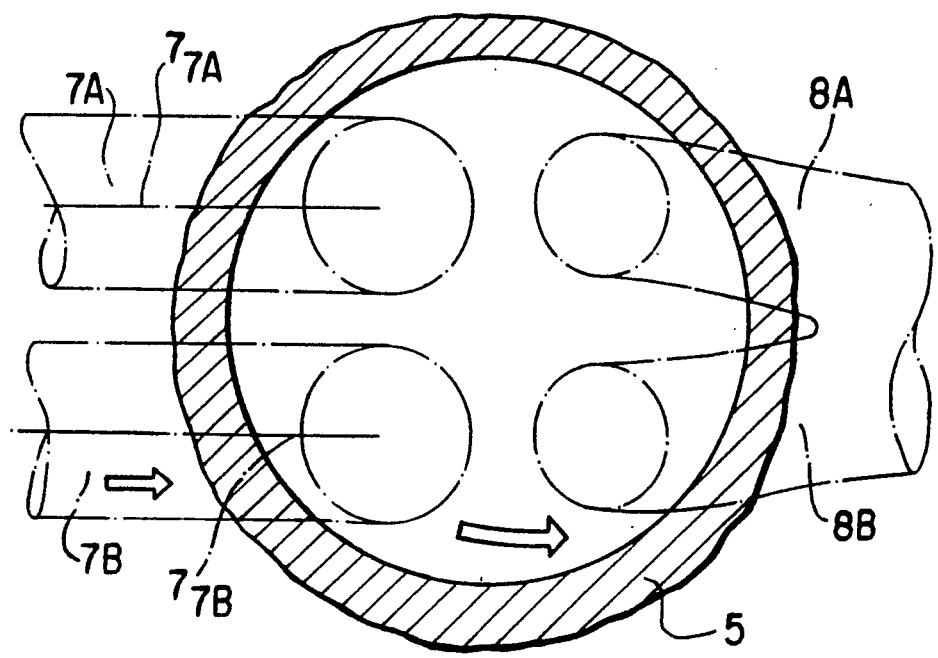
FIG. 25 is an enlarged plan view of a combustion chamber cooperating with an intake system in accordance with another preferred embodiment of the present invention.

Such swirl intake port, having a generally isosceles triangular cross section as shown in FIG. 24, may be provided in an intake system having a pair of intake ports with center lines which are parallel to each other in a direction in which a crankshaft of the engine extends, as shown in FIG. 25.

Figure 26:
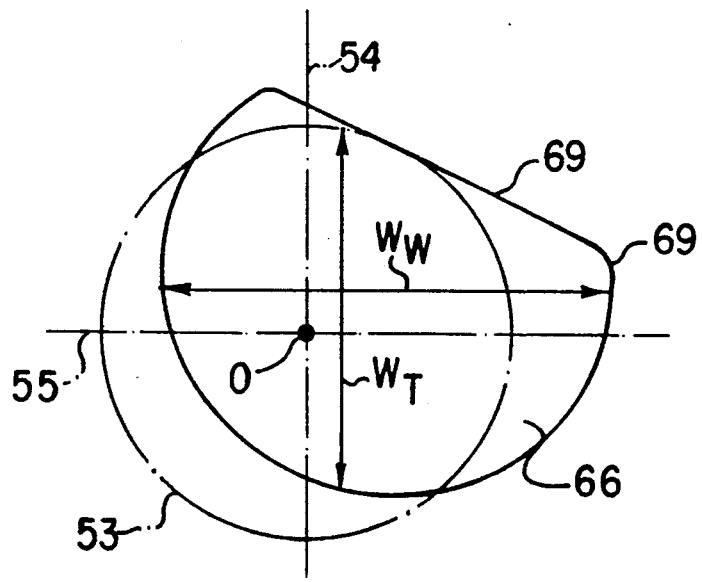
FIG. 26 is a plan view of a variation of the cross section of the swirl intake port.

FIG. 26 shows a swirl intake port 7B in accordance with another preferred embodiment of the present invention. A cross section 66 of the swirl intake port has a circular configuration which is partly cut off and, therefore, flat. More particularly, a flat portion 69 of the flat sided circular cross section 66 is tangential to the base circle 53 and disposed at an acute angle relative to the center line 55. Further, a corner 69a of the cross section 66 is offset toward the periphery of the combustion chamber 6 with respect to the center line 54 passing through the vertical center line Px of the combustion chamber 6.

One of the widest portions of the cross section 56, indicated by a reference $W_T$, is on the forward side of flowing of intake air with respect to the center line 54, and the other of the widest portions of the cross section 56, indicated by a reference $W_W$, in a direction perpendicular to the widest portions $W_T$, is on a side of the vertical center line Px of the combustion chamber 6 with respect to the center line 55. Accordingly, the swirl intake port 7B provides an intake air column nonuniformly distributed, in quantity, over the cross section. That is, the intake air column has a flow rate which is higher on the side of the periphery of the combustion chamber 6 than on the side of the center Px of the combustion chamber 6, and also has a flow rate which is higher on an upper side of the combustion chamber 6 than on a lower side of the combustion chamber 6.

It is to be understood that although preferred embodiments of the present invention have been described, various other embodiments and variants may occur to those skilled in the art any such other embodiments and variants which fall within the scope and spirit of the invention are intended to be covered by the following claims.

What is claimed is:

1. An intake system for an internal combustion engine, including an intake port for forming an intake passage to a combustion chamber of the engine so as to produce vertical turbulence of intake air in said combustion chamber during an intake stroke, said intake system comprising:

an intake pipe for forming an upstream part of an air passage for feeding air as intake air to said combustion chamber; and an intake port, formed in said engine, for coupling said intake pipe with said combustion chamber and forming a downstream part of said air passage; said intake port comprising:

a downstream intake port portion, opening at a downstream end into said combustion chamber and opened and shut by an intake valve, for forming a downstream portion of said downstream part of said air passage, said downstream intake port portion having an almost round cross section throughout its length and a downstream center line which curves so as to be farther away from an axis in which said intake valve moves as it becomes farther far away from said downstream end; and an upstream intake port portion, continuously extending from said downstream intake port portion and opening at an upstream end to an outside of said engine, for forming an upstream portion of said downstream part of said air passage, said upstream intake port portion having a cross section, an upstream center line of which extends in a straight line and is symmetrical with a transverse center line drawn in a plane including said axis and said upstream center line, said cross section including an inner half cross section on an inner side of said upstream center line close to said axis and an outer half cross section on an outer side of said upstream center line remote from said axis, said outer half cross section being made smaller in area than said inner half cross section.

2. An intake system as defined in claim 1, wherein said inner half cross section is larger in area than a half of said almost round cross section of said downstream intake port portion and said outer half cross section is smaller in area than a half of said almost round cross section of said downstream intake port portion.

3. An intake system as defined in claim 2, wherein said cross section of said upstream intake port portion has a downstream end identical in configuration with an upstream end of said downstream intake port portion and gradually increases in area.

4. An intake system as defined in claim 3, wherein said cross section of said upstream intake port portion is generally triangularly configured.

5. An intake system as defined in claim 3, wherein said inner half cross section is generally rectangularly configured so as to have a lengthwise side spatially tangential to an outer periphery of said almost round cross section of said downstream intake port portion, and said outer half cross section is generally semi-circularly configured.

6. An intake system as defined in claim 3, wherein said intake pipe has a cross section which has a center line which curves oppositely relative to said downstream center line of said almost round cross section of said downstream intake port portion and which is symmetrical with a transverse center line in a plane including said axis and said upstream center line and has an inner half cross section on an inner side of said center line close to said axis, and an outer half cross section on an outer side of said center line remote from said axis which is made larger in area than said inner half cross section.

7. An intake system as defined in claim 6, wherein said outer half cross section of said cross section of said intake pipe is larger in area than a half of said almost round cross section of said downstream intake port portion, and said inner half cross section of said cross section of said intake pipe is smaller in area than a half of said almost round cross section of said downstream intake port portion.

8. An intake system is defined in claim 7, wherein said cross section of said intake pipe has a downstream end identical in configuration to an upstream end of said upstream intake port portion and gradually increases in area.

9. An intake system as defined in claim 8, wherein said cross section of said intake pipe is generally triangularly configured.

10. An intake system as defined in claim 8, wherein said outer half cross section of said cross section of said intake pipe is generally rectangularly configured so as to have a lengthwise side spatially tangential to an outer periphery of said almost round cross section of said downstream intake port portion, and said inner half cross section of said cross section of said intake pipe is generally semi-circularly configured.

11. An intake system as defined in claim 1, and further comprising an intake pipe for forming another upstream part of another air passage for feeding air as intake air to said combustion chamber; and a swirl intake port, formed in said engine, for coupling the other intake pipe with said combustion chamber and forming a downstream part of the other air passage so as to produce a swirl flow of intake air in a circumferential direction in said combustion chamber; said swirl intake port being directed toward a periphery of said combustion chamber rather than a center of said combustion chamber and having a cross section with a widest portion, in a direction of a transverse diametric center line of said cross section, passing a vertical center line of said combustion chamber, which is offset toward said periphery of said combustion chamber from said transverse diametric center line.

12. An intake system as defined in claim 11, wherein said cross section has the widest portion in a direction of another transverse diametric center line perpendicular to said transverse diametric center line which is offset toward said vertical center line of said combustion chamber from the other transverse diametric center line.

13. An intake system as defined in claim 12, wherein said cross section is generally configured as an isosceles triangle.

14. An intake system as defined in claim 13, wherein said isosceles triangle has a base internally touching a base circle and a rounded vortex outside said base circle.

* * * * *